May 30, 1933.  C. PEARSON  1,911,388
MOWER
Filed Dec. 5, 1928  4 Sheets-Sheet 1

Inventor.
Charles Pearson.
By H.P. Daniels
Atty.

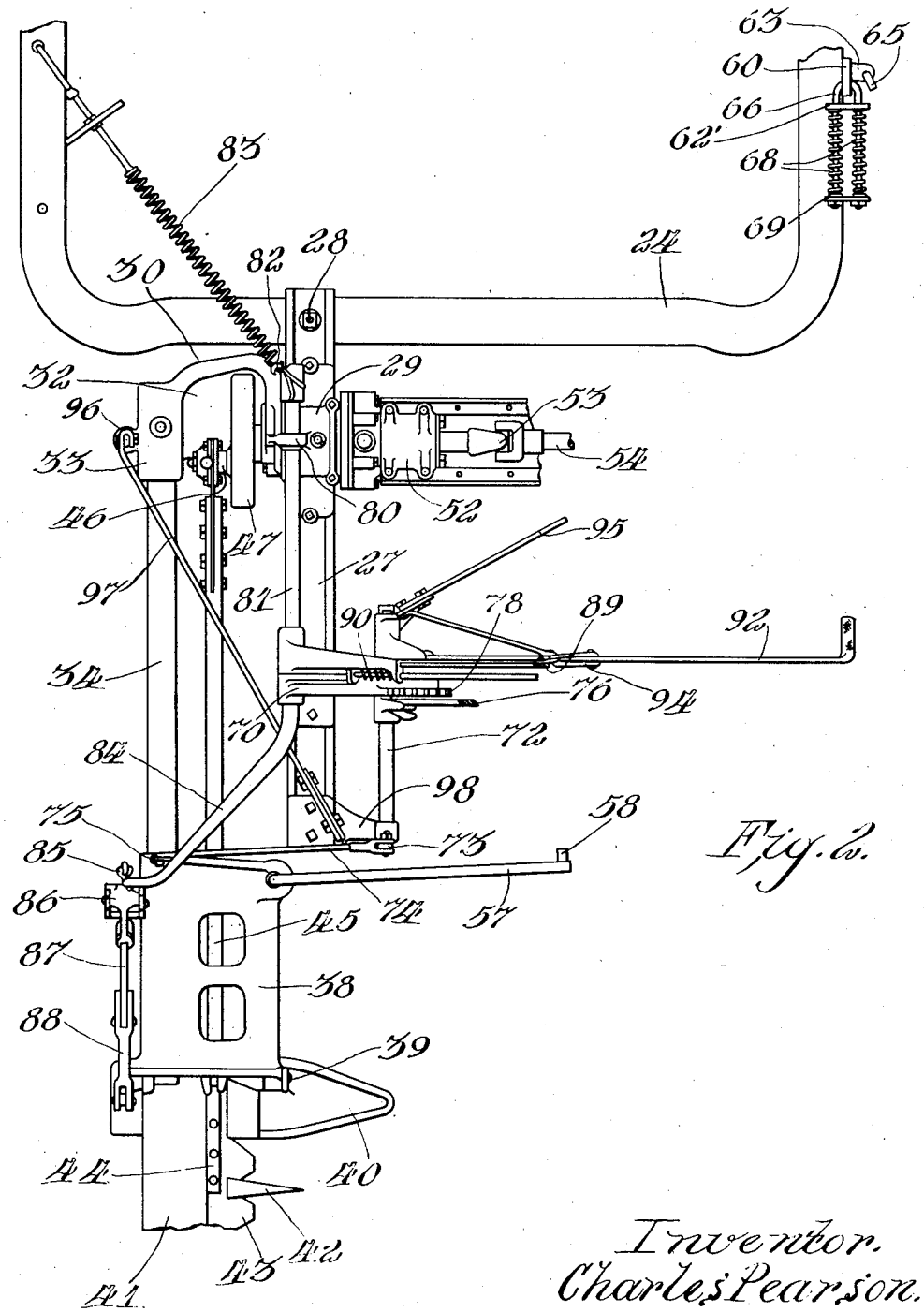

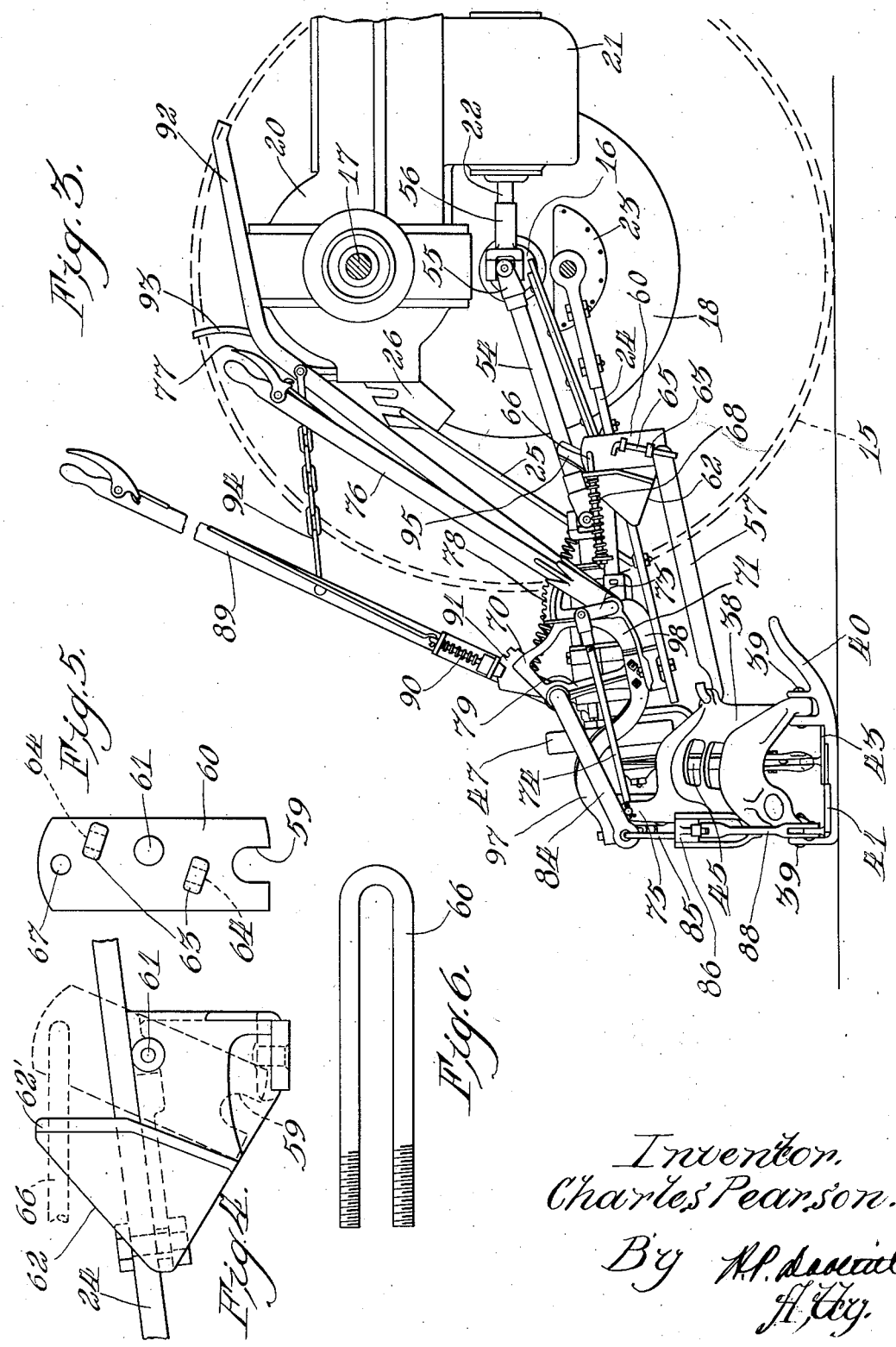

May 30, 1933.     C. PEARSON     1,911,388
MOWER
Filed Dec. 5, 1928     4 Sheets-Sheet 4
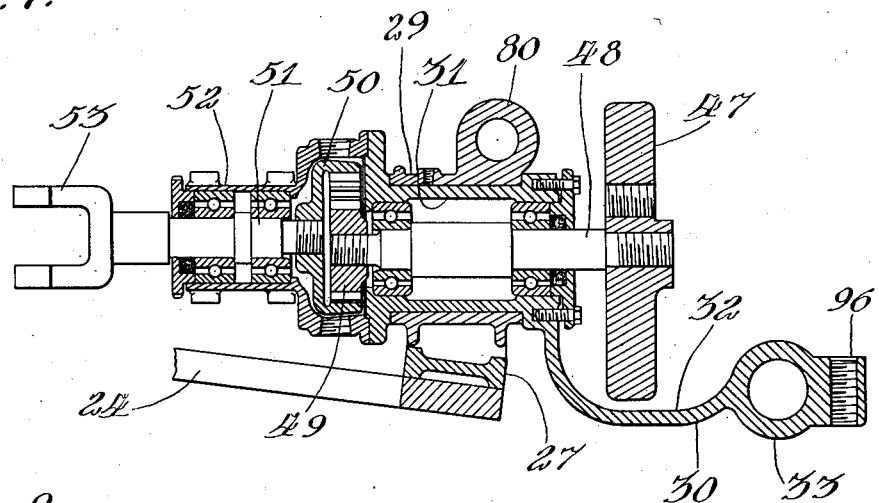
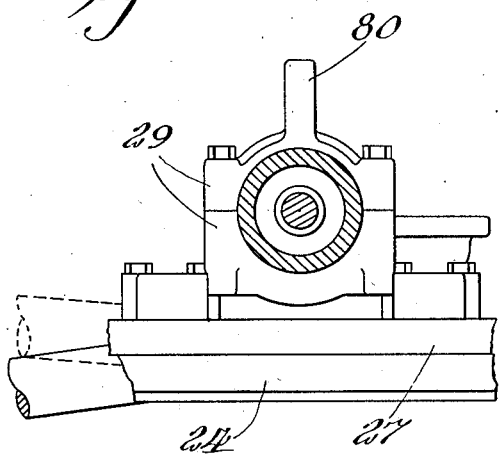
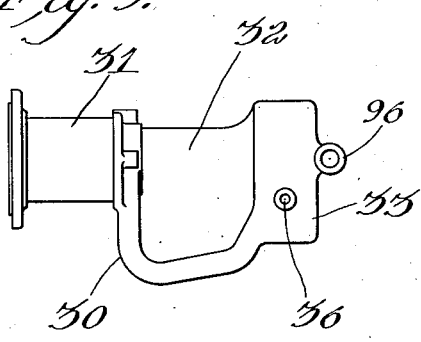
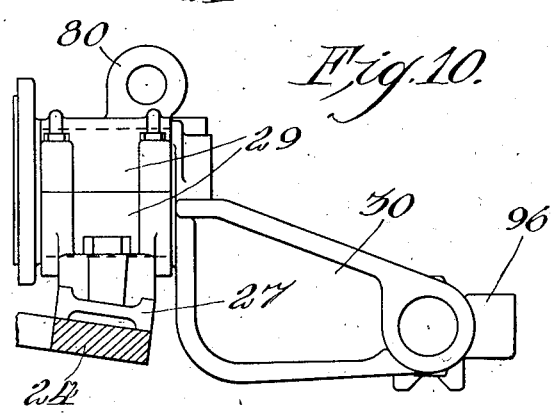
Inventor.
Charles Pearson.
By [signature]
Atty.

Patented May 30, 1933

1,911,388

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

MOWER

Application filed December 5, 1928. Serial No. 323,848.

The invention is in a mower and particularly in a mower of the type adapted to be tractor drawn and tractor driven.

In using tractors to propel and drive mower attachments, it is possible materially to speed up the mowing operation as compared with the use of draft animals. This relatively faster passage of the mower through the field is very desirable, but such advantage has often been minimized due to the difficulty encountered because of obstructions such as rock and stumps in the field which the laterally extending cutter bar of the mower might strike with the ever present danger of its destruction under such impact.

More specifically then, the invention relates to a mower attachment for tractors in which structure is provided which will completely overcome any danger of breakage of the cutter bar, should it strike an obstruction, as stated.

The primary object of this invention, therefore, is to provide a mower and particularly a mower attachment for a tractor, the laterally extending cutter bar of which is connected by an improved frame structure to the drawbar of the tractor in such a manner that, when the cutter bar strikes an obstruction, an automatically acting release coupling becomes uncoupled to cause said cutter bar and mower frame to swing back as a unit to minimize the impact with the obstruction and thus avoid damage to the mower.

Other objects are to provide a mower attachment of this kind, which is driven from a power take-off shaft from the tractor transmission, and which mower frame may rock about the axis of the main or power take-off shaft to effect lifting adjustment of the cutter bar; to provide an improved release coupling structure which will cause the cutter bar and mower frame to become free for rearward pivotal swinging movement when the cutter bar strikes an obstruction; and, lastly, generally to improve mower attachments for tractors of the kind herein disclosed.

The present invention is an improvement of the mower attachment disclosed in Patent Number 1,772,264 issued August 5, 1930.

Other objects will be apparent to those skilled in this art as this disclosure continues.

Briefly, these objects are achieved in the provision of a mower which has a main frame member turnably mounted in a main frame pivot part, which is carried on a plate or base member, which plate at one end is pivoted to a support such as the drawbar of a tractor. The main frame is turnable in the main frame pivot on an axis in coaxial alignment with the power take-off shaft coming from the tractor transmission to drive the sickle included in a rearwardly and laterally extending cutter bar which is connected by means of a coupling yoke and a coupling arm to the main frame member.

The coupling yoke is connected by an improved release coupling to the tractor drawbar at a point remote from the pivotal connection of the main frame plate or base member, so that, when the cutter bar strikes an obstruction, the coupling yoke is freed from the release coupling, so that the entire mower structure may swing back with the base plate about the pivotal connection of said base plate. The mower structure includes the usual levers for effecting tilt and lift of the cutter bar, which lever structure also swings back with the mower as a part thereof when an obstruction is encountered and when the release coupling has been disconnected. When the mower bar is lifted, the main frame member rocks in the main pivot part about the axis of the power transmission shaft from the tractor. As will later appear, the power transmission shaft is detachably splined to the power transmission shaft of the tractor, so that the drive to the sickle is also caused to be disconnected when the mower bar is released for rearward swinging movement.

Reference should now be made to the accompanying sheets of the drawings, in which:

Figure 2 is a similar view, but shows the tractor mower attachment in its extreme rearwardly swung position after an obstruction has been encountered and the release coupling has been disconnected;

Figure 3 is a side elevational view of the structure shown in Figure 1;

Figures 4, 5 and 6 are detail views of the release coupling structure;

Figure 7 is a central vertical sectional view through the main frame, the main frame pivot parts, and the transmission parts, as seen along the line 7—7 when viewed in the direction of the arrows, which section line appears in Figure 1;

Figure 8 is a cross sectional view of the same structure as seen along the line 8—8 when looking in the direction of the arrows, which line is shown in Figure 1;

Figure 9 is a plan, detail, elevational view of the main frame part; and,

Figure 10 is a side elevational view of a part of the structure shown in Figure 7.

Figure 1:
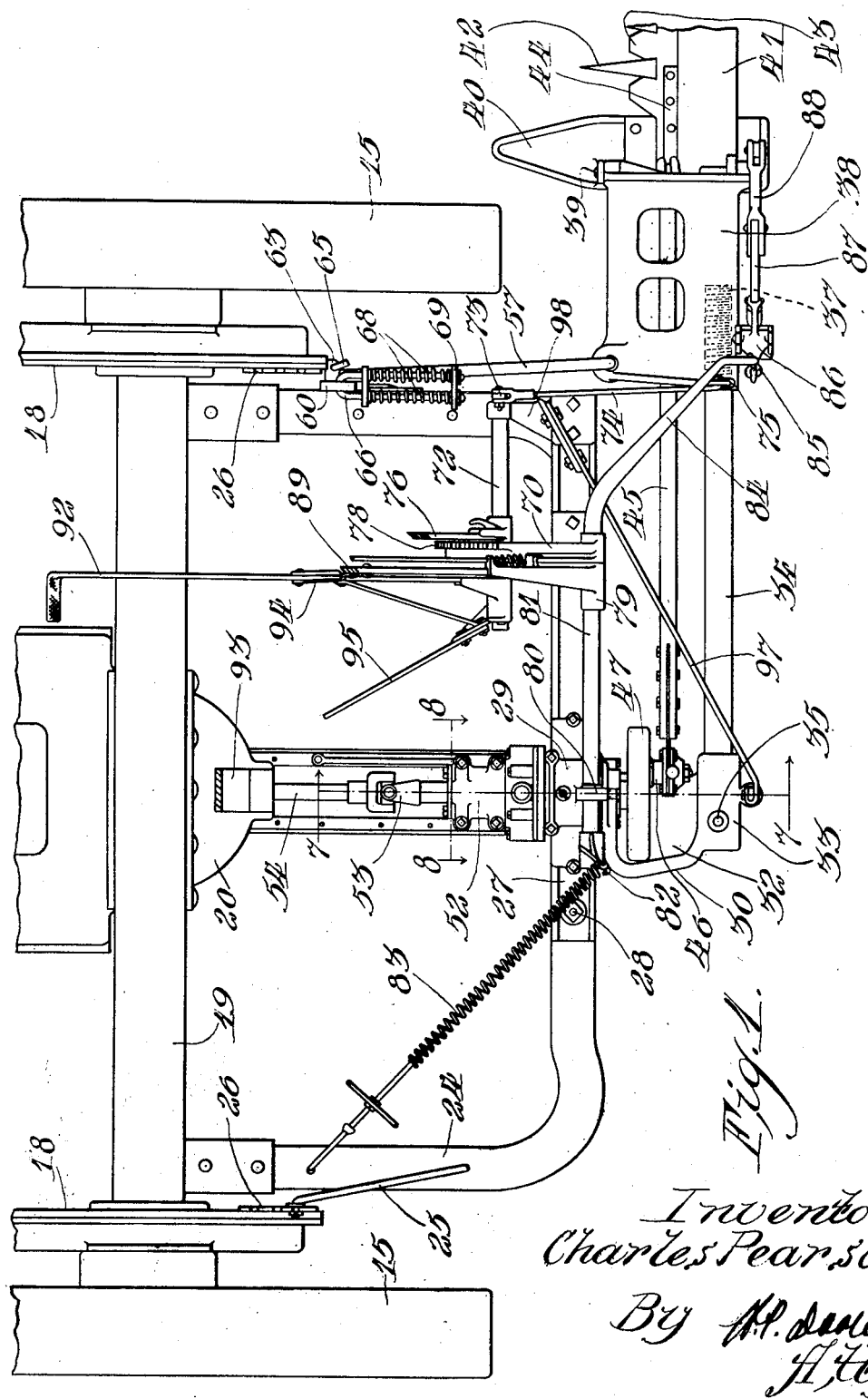
Figure 1 is a top plan view of the rear end of a tractor with its drawbar and the improved mower attachment connected thereto, as when the mower is in its normal cutting position.

Figures 1 and 3 show that an illustrative embodiment of this improved mower attachment has been disclosed in connection with a tractor having rear wheels 15, stub axles 16, only one of which is shown, a differential drive shaft 17, and depending gear casings 18, which house gearing for connecting the shaft 17 to drive the stub axles 16 and the traction wheels 15. The differential shaft 17 is encased in an elevated rear axle houseing 19 to which is centrally bolted the differential housing 20, in which are journaled the usual gears which drive the said differential shaft. Forwardly of the housing 20 is a transmission housing 21 from which rearwardly protrudes the tractor power take-off shaft 22. Each of the depending casings 18 carries a gudgeon plate 23 on its inner side, from which is pivotally hung the legs or arms of a U-shaped draft bar 24, which extends rearwardly of the tractor and is additionally supported by means of rods 25 adjustably hung from notched plates 26 carried at the top of the casings 18. From this it will be seen that the tractor is of the all-purpose type having a high, arched rear axle construction to enable the same to span row crops when used for that purpose.

The U-shaped draft bar 24 forms the support which carries the improved mower now to be described. The bight portion of the U-bar 24 has mounted thereon a normally transversely disposed plate or base frame member 27 which extends coextensively with the bight of the U-bar 24 throughout substantially its length, and has its left hand end, as seen in Figure 1, connected to said bar 24 for pivotal movement about a vertical bolt 28.

Substantially in line with the tractor power take-off shaft 22, the base plate 27 has bolted thereto what may be termed a main frame pivot block 29, which in effect is a sleeve bearing in which is rockably mounted for movement on a longitudinal axis, a main, mower frame part 30. This main frame includes a sleeved, circular extension 31 at its front end, which fits in the main frame pivot block 29, as best shown in Figures 7 and 8. The part 30 is formed with a trough extension 32 to receive the flywheel, which will later be described, and the part 30 also includes a sleeve 33 extending at a right angle to the axis of the main frame for receiving a normally transversely extending coupling arm 34. Said arm 34 at its left hand end, as seen in Figure 1, is loosely fitted into the sleeve 33, but made fast therein by means of a vertical pin 35 which fits into a hole 36 in said sleeve part 33, as best shown in Figure 9.

The grassward end of the coupling arm 34 is threaded as at 37, as shown in Figure 1, to turnably or rockably receive and carry a coupling yoke 38. This coupling yoke 38 carries the usual pivot pins 39 for floatingly carrying the mower shoe 40, which shoe in turn carries the transversely extending cutter bar 41 including the usual guard fingers 42, reciprocating sickle or knife 43, and knife head 44, which is reciprocated from a pitman 45, as will now be described.

The pitman 45 has its stubbleward end connected to an eccentric wrist pin 46 carried on a flywheel 47 arranged in the pocket 32 in the main frame part 30.

The flywheel 47 is made fast to the rear end of a longitudinally extending transmission shaft 48 suitably journaled within bearings in the main frame collar extension 31 (see Figure 7), the forward end of said shaft 48 carrying fast thereon a pinion 49 which meshes with an enlarged internal ring gear 50 fast on the rear end of a transmission shaft part 51 suitably journaled within bearings in an extension 52 of the main frame part 31. The shaft 51 passes out of the extension 52 and at its exposed forward end carries a universal joint 53 connected with a line shaft 54, as shown in Figures 1 and 3, which line shaft in turn at its front end carries another universal joint 55 and a splined sleeve 56 detachably connected to the tractor power take-off shaft 22.

It can now be seen that the mower knife 43 will be reciprocated from the flywheel 47 which is rotated from the shaft 48. The gear arrangement 49, 50 serves to speed up the rotation of the flywheel and gives the proper faster speed of reciprocation for the sickle 43.

As the entire mower frame is carried on the pivoted plate 27, means must be provided for holding the cutter bar in its transverse laterally extending, normal cutting position when the tractor pulls the same through the field. Such means in this invention is in the form of a release coupling which will automatically be disconnected when the cutter bar collides with an obstruction in the field. This release connection embodies a forwardly extending coupling rod 57 which, at its forward end, as best shown in Figure 2, has a lateral pin extension 58 which normally is engaged in a notch 59 in a latch plate 60, which plate is pivoted at 61 on a bracket 62 bolted to the grassward leg of the U-shaped draft bar 24. See Figures 4, 5 and 6. The plate 60 is provided with bosses 63 having aligned openings 64 which receive a detachable pin 65 that functions to prevent lateral displacement of the rod 57 and its pin 58 from the notch 59. The bracket 62 has at its upper end a pair of spaced openings which receive a hair-pin member 66, which at its front end passes through an opening 67 in the upper end of the latch plate 60 to be connected therewith. The legs of the hair-pin in back of the bracket 62 each carry compression springs 68 which are retained on the legs of the hair-pin between the bracket extension 62' and an end abutment plate 69. The force of the springs exerts a pull to hold the latch plate 60 in its normal vertical position to lock the pin 58 of the coupling arm 57 in a position held by the notch 59 to the bottom of the latch plate 60.

It will now be clear that, when the mower cutter bar 41 strikes an obstruction with a force sufficiently strong to overcome the resistance of the springs 68, the coupling rod 57 will exert a pull transmitted from the cutter bar 41 to rock the latch plate 60 on its pivot 61 to swing the lower end of said plate back, which causes the pin 58 of the coupling rod 57 to ride out from the notch 59, and thus the entire mower bar and its frame are free to pivot back with the plate 27 on its pivot pin 28. The drive also will be stopped obviously, as the splined sleeve 56 merely disconnects endwise from the power take-off shaft 22.

Means, of course, must be provided to effect tilt and lift adjustments of the cutter bar while the same is being operated. The tilt adjustment will first be described.

An upright bracket 70 is securely bolted to the right hand end of the plate 27 and this bracket 70 has a forwardly extending leg part 71 in which is rockably journaled a transverse stub or counter-shaft 72 having at its right hand end a crank 73 which has a link connection 74 with an upright extension 75 integrally formed on the coupling yoke. A lever 76 is connected to the shaft 72 to rock the same through the crank 73 and link 74. The coupling yoke 38 may thus be rocked fore and aft on the coupling arm 34 to tilt the mower bar 41. The lever 76 is provided with the usual detent lock 77 and rack sector 78 to retain the parts in any set adjusted position, as is usual in this art.

The lift adjustment for the mower bar will next be described. The bracket 70 includes a vertically and slightly rearwardly extending leg part 79 and the main frame pivot block 29 includes an eye extension 80 in transverse alignment with an opening in the leg 79 of the bracket 70. This eye 80 and said opening rockably carry a transverse shaft 81 which at its stubbleward end is provided with a small crank extension 82 that has connected therewith a counter-balancing spring 83 anchored in any suitable manner to a remote point as for example on a leg of the U-shaped tractor drawbar 24, as best shown in Figure 1. The opposite end of the shaft 81 has a relatively long crank extension 84 which is connected, by means of a depending link 85, to a rock arm 86 connected by the usual pull links 87 to a lift link 88 pivotally connected to the back end of the mover shoe 40, as best shown in Figures 1 and 3. For a more detailed description and better showing of this structure see applicant's Patent No. 1,257,387 of February 26, 1918. A hand lever 89 is fixed to the shaft 81 to rock the same to raise and lower the cutter bar 41 through the crank and link structure described. A usual form of detent 90 and rack sector 91 is provided to lock the lever 89 in adjusted position. A foot lever 92 is arranged in a convenient position to the foot of the operator on the tractor seat, which seat is carried on a support 93 shown in Figure 1. This lever 92 forms no part of the present invention and is mounted in such a manner on the shaft 72 as to assist the lever 89 through the connection 94 to effect lift adjustments of the cutter bar.

A runner support structure 95 is connected to any suitable part of the mower and functions as a guide which engages the drawbar on the tractor when the mower is engaged or disengaged for the purpose of guiding the upper end of the foot lever 92 over the traction lugs (not shown) on the adjacent tractor wheel.

The main frame part 30 is provided with a vertical eye 96 to receive a screw bolt for mounting a brace rod 97, which brace rod has its other end connected to a bracket 98 carried on the plate 27. The bracket 98 also supports one end of the shaft 72.

In use the mower frame may include the entire U-shaped drawbar 24, the plate 27, block 29, and the frame 30 of the mower which the drawbar 24 carries. This is so because the U-shaped drawbar 24 is designed for easy attachment to and detachment from the tractor. In another form, the U-shaped drawbar 24 can be left on the tractor at all times to cooperate with all sorts of implements, and then the mower frame may comprise only the plate 27, pivot block 29, and main frame part 30, which are carried on the drawbar along with the release coupling structure described.

In operation the mower appears as shown in Figure 1, in which the splined sleeve 56 is detachably connected with the power take-off drive shaft 22 of the tractor. The plate 27, due to the forward pull of the tractor and the resistance of the cutter bar, cannot pivot back on the pin 28 because the force of the springs 68 is such as to lock the pin 58 in its seat 59 on the latch plate 60. In this fashion for normal cutting the mower cutter bar 41 is maintained in its transverse operative position. The mower now travels with the tractor through the field, and let us assume that the bar 41 encounters an obstruction with sufficient force to overcome the resistance of the latch springs 68. The direct pull transmitted by the cutter bar 41 through the longitudinally extending coupling rod 57 then causes the latch plate 60 to pivot with its lower end back about the pivot 61 thereof, which releases the coupling rod 57. Thus, the entire mower structure is free to swing back about the pivot pin 28 relatively to the tractor from the normal position of the parts shown in Figure 1 to the abnormal position of the parts shown in the extreme position in Figure 2. At the same time, of course, the splined sleeve 56 pulls out from the power take-off shaft 22, and thus the drive to the sickle 43 is stopped. The mower has now been saved from injury which might have been caused thereto by impact with the obstruction but for the release coupling of this invention. When it is desired to resume cutting by returning the mower to its normal position as shown in Figure 1, it is to be understood that the tractor will be backed sufficiently to bring the cutter bar back in its lateral position, and then the operator by hand couples the splined sleeve 56 with the shaft 22. He returns the pin 58 of the coupling rod 57 to its notch 59 by raising the pin 65 slightly to permit easy entrance of the pin 58 in said opening 59. When the parts are coupled, the pin 65 is dropped to its normal position shown in Figure 3, and endwise displacement of the coupling rod is thus prevented.

Rearward swinging of the mower frame does not interfere with the counter-balance spring 83 which helps lift the weight of the mower cutter bar when the same is adjusted, because of its connection so closely contiguous to the pivot pin 28. The runner 95 prevents clashing of the foot lever 92 with lugs on the adjacent tractor wheel 15 when the mower frame swings, as has been described.

It is interesting to note that when the adjusting levers 89 or 92 are manipulated to raise the cutter bar 41, the axis of lifting movement for the bar 41 and coupling arm 44 is coincident with the axis of turning movement of the main frame part 30 in coaxial alignment with the axis of the power transmission shaft 48.

From this disclosure, it must now be clear that an improved mower attachment has been provided for a tractor, which achieves all of the desirable objects heretofore recited.

It is the intention to cover all such changes and modifications of the illustrative embodiment of the invention herein disclosed which do not materially depart therefrom as indicated in the following claims.

What is claimed is:

1. The combination with a tractor having a drawbar, of a mower having a frame part pivotally connected at one point to the drawbar, a coupling bar extending laterally of the frame part, a coupling yoke connected to the end of the coupling bar, a cutter bar connected to the yoke, a release coupling carried on the drawbar at another point, a coupling rod carried by the yoke and releasably connected to the release coupling, said release coupling and rod being arranged in a substantially longitudinal line whereby when the cutter bar strikes an obstruction a direct pull will be transmitted through the coupling rod to disconnect the same from the release coupling.

2. The combination with a tractor having a drawbar, of a mower attachment for the tractor comprising a plate pivotally connected at one end to the drawbar, a main frame pivot block having a longitudinal bore mounted on the plate, a main frame member rockably mounted in the bore of the block, a coupling bar extending laterally of the main frame member, a coupling yoke on the grassward end of the coupling bar, a cutter bar connected to the coupling yoke, and a releasable coupling connection from the drawbar to the coupling yoke.

3. The combination with a tractor having a drawbar, of a mower frame including a mower cutter bar, said frame pivotally connected at one point to the drawbar, a bracket secured to another point on the drawbar, a pivoted latch plate on the bracket, said plate having a notch therein, a coupling rod connecting the mower to the latch plate at the notch, and spring means normally holding the latch plate against pivotal movement and in latching position to hold the mower cutter bar in its normal cutting position.

4. The combination with a tractor having a drawbar, of a mower frame pivotally mounted at one point on the drawbar, a coupling yoke and cutter bar connected to the frame, a bracket at another point on the drawbar, a latch plate pivotally mounted on said bracket, a coupling rod connecting the coupling yoke releasably with the latch plate, and means exerting a force normally to hold the latch plate against pivotal movement to retain the mower frame and cutter bar against movement about its pivot on the drawbar.

5. The combination with a tractor having a drawbar, of a mower frame pivotally supported by the drawbar, a coupling yoke including a cutter bar connected to the frame, a stationary bracket mounted adjacent the coupling yoke and at a point forwardly thereof, a latch means carried on said bracket, and a substantially longitudinally extending coupling rod connected to the coupling yoke and releasably connected to said latch means.

6. The combination with a tractor having a drawbar, of a mower frame pivotally supported by the drawbar, a coupling yoke and cutter bar connected to the frame, a stationary bracket mounted adjacent the coupling yoke, a latch plate pivotally mounted on the bracket, said plate having a notch therein, a coupling rod secured to the coupling yoke and connected to the latch plate by means of said notch, means preventing lateral disengagement of the coupling rod from the notch in the latch plate, and spring means normally acting to resist pivotal movement of said latch plate and release of the rod from the notch in the plate.

7. In combination, a support, a mower connected to the support by a normally inoperative pivotal connection, means embodying an overload release connection for causing said mower to be displaced angularly in a horizontal plane rearwardly with respect to said support when the same encounters an obstruction, and a guide runner ridable on the support when the mower is thus displaced or returned to normal cutting position.

8. The combination with a tractor including a support, of a base member on the support, a main frame pivot block on the base member, a main frame member turntably mounted in the pivot block, a coupling bar detachably connected to the main frame member, a coupling yoke rockably mounted at the other end of the coupling bar, and a mower cutter bar connected to the coupling yoke.

9. The combination with a tractor having a drawbar, of a main frame pivot block member mounted on the drawbar, a main frame member rockably mounted in said pivot block on a longitudinal axis, a transverse sleeve included in the main frame member, a coupling arm in said sleeve of the main frame member, a coupling yoke rockably carried on the grassward end of the coupling bar, a cutter bar connected to the coupling yoke, and a pin detachably connecting the stubbleward end of the coupling bar in the sleeve of the main frame member.

10. The combination with a tractor having a drawbar, of a mower frame including a main frame pivot block on the drawbar, a main frame member rockably mounted on a longitudinal axis in the pivot block, a coupling bar carried by the main frame, a coupling yoke carried by the coupling bar, a cutter bar connected to the coupling yoke, a bracket included in the mower frame, a transverse shaft rockably mounted on said bracket and in a bearing provided on the pivot block, and means for controlling vertical adjustment of the cutter bar upon rocking movement of said shaft.

11. The combination with a tractor having a drawbar and a transmission including a power take-off shaft, of a mower connected to the drawbar and supported thereby, said mower including a main frame member rockably mounted on a longitudinal axis in a bearing block carried on the drawbar, mower structure connected to the main frame, and shafting connected to the tractor power take-off shaft and arranged substantially coaxial with the rocking movement of the main frame member.

12. The combination with a tractor having a power take-off shaft and a drawbar, of a mower attachment on the tractor comprising a pivot bearing block mounted on the drawbar, a mower main frame including a trough, said main frame being rockable in the bearing block on a longitudinal axis in substantial alinement with the tractor power take-off shaft, longitudinally extending shafting adapted to be connected to the power take-off shaft of the tractor and extending into the trough in the main frame, a flywheel on the end of the shafting in said trough, a mower structure connected to the main frame including a cutter bar, and means for operating the cutter bar from the flywheel.

13. The combination with a tractor having traction means at each side thereof and a support detachably carried at the rear end of the tractor, of a mower comprising a coupling arm normally disposed transversely of the rear end of the tractor, a yoke carried at the grassward end of said arm, a cutter bar hingedly connected to the yoke to extend normally transversely of the line of travel of the grassward traction means of the tractor and rearwardly thereof, a normally substantially longitudinally disposed pull rod connected to the yoke, means releasably holding the front end of said rod at a point adjacent said grassward traction means of the tractor, and means to carry the inner end of said coupling arm for swinging movement relative to the support so that when the cutter bar strikes an obstruction to release the rod the cutter bar and arm as a unit may swing back horizontally to assume a position rearwardly of the tractor.

14. The combination with a tractor having traction means at each side thereof and a support detachably carried at the rear end of the tractor, said tractor including a rearwardly extending power take-off shaft, of a mower comprising a coupling arm normally disposed transversely of the rear end of the tractor, a yoke carried at the grassward end of said arm, a cutter bar hingedly connected to the yoke to extend normally transversely of the line of travel of the grassward traction means of the tractor and rearwardly thereof, a knife carried by the bar, means to drive the knife from said power take-off shaft, a normally substantially longitudinally disposed pull rod connected to the yoke, means releasably holding the front end of said rod at a point in proximity to said grassward traction means of the tractor, and means carrying the coupling arm for swinging movement so that when the cutter bar strikes an obstruction to release the rod the cutter bar and arm as a unit may swing back horizontally to assume a position rearwardly of the tractor.

15. The combination with a tractor having traction means at each side thereof and a support detachably carried at the rear end of the tractor, said tractor including a rearwardly extending power take-off shaft, of a mower comprising a coupling arm normally disposed transversely of the rear end of the tractor, a yoke carried at the grassward end of said arm, a cutter bar hingedly connected to the yoke to extend normally transversely of the line of travel of the grassward traction means of the tractor and rearwardly thereof, a knife carried by the bar, means including a normally transversely extending pitman for driving the knife from the power take-off shaft, a normally substantially longitudinally disposed pull rod connected to the yoke, means releasably holding the front end of said rod at a point in proximity to said grassward traction means of the tractor, and means carrying the coupling arm for swinging movement so that when the cutter bar strikes an obstruction to release the rod the cutter bar and arm as a unit may swing back horizontally to assume a position rearwardly of the tractor, said pitman also mounted to swing backwardly with the coupling arm.

In testimony whereof I affix my signature.

CHARLES PEARSON.